July 5, 1932.  H. G. KELLOGG  1,865,570
METHOD OF MANUFACTURING RADIATOR SHELLS
Filed Dec. 22, 1930  6 Sheets-Sheet 1
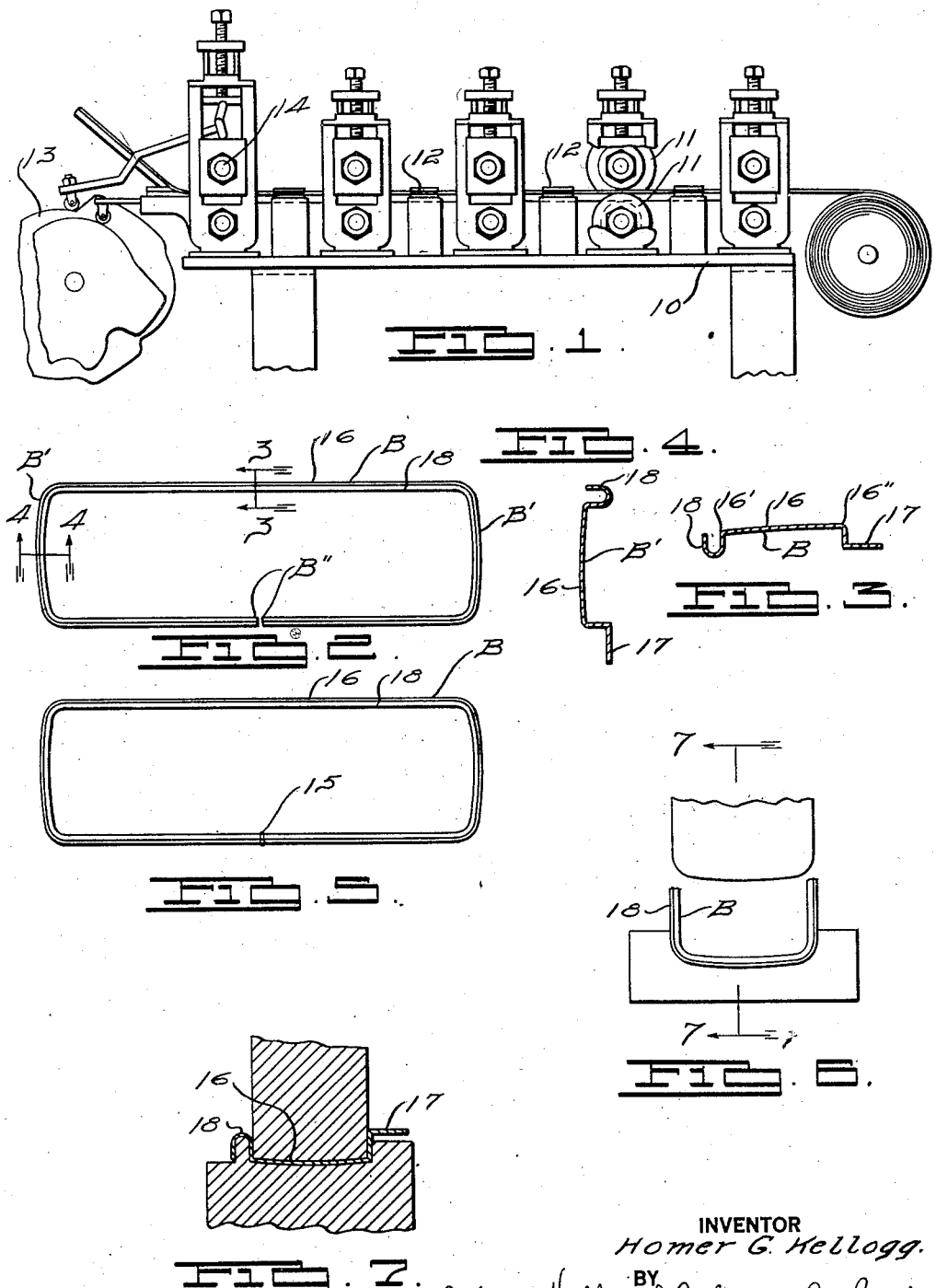
INVENTOR
Homer G. Kellogg.
BY
Whittemore Hulbert Whittemore Belknap
ATTORNEYS.

July 5, 1932.  H. G. KELLOGG  1,865,570
METHOD OF MANUFACTURING RADIATOR SHELLS
Filed Dec. 22, 1930  6 Sheets-Sheet 2
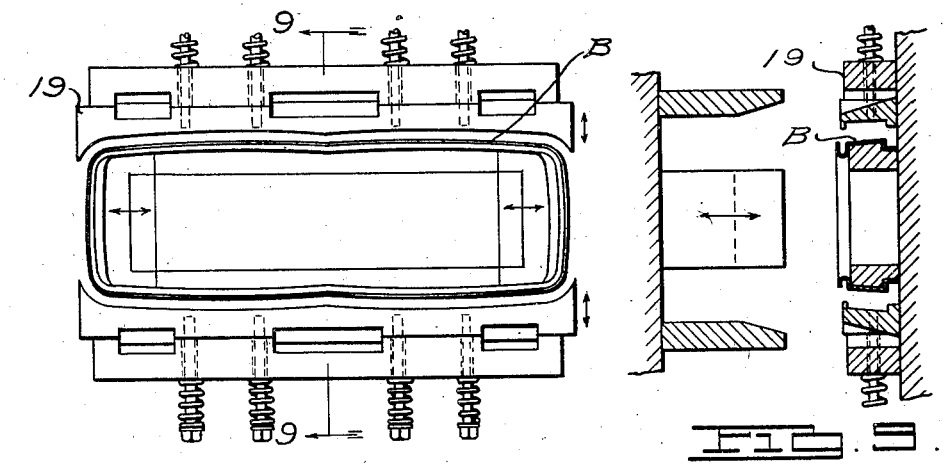
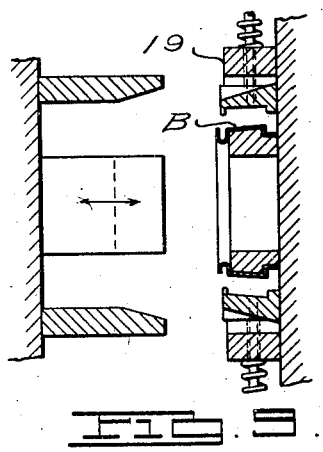
FIG. 3.
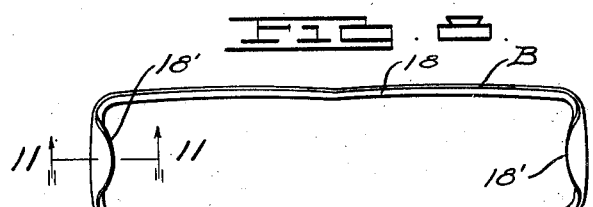
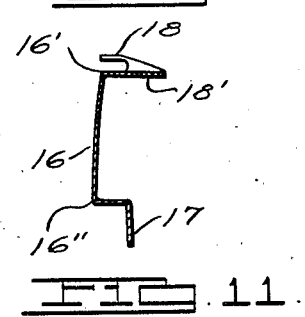
FIG. 10.  FIG. 11.
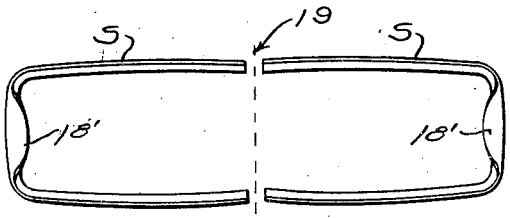
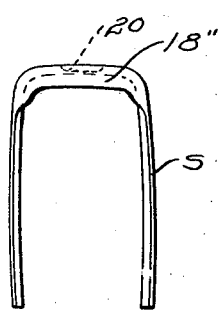
FIG. 12.  FIG. 14.
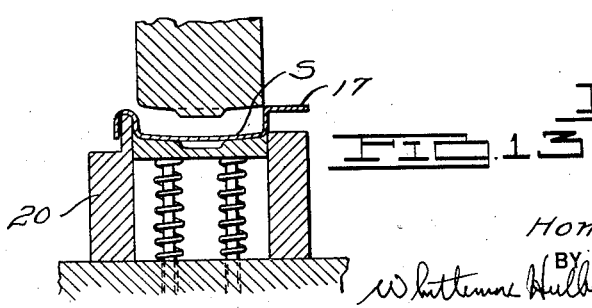
FIG. 13.
INVENTOR
Homer G. Kellogg.
BY
Whittemore Hulbert W Whittemore Belknap
ATTORNEYS.

July 5, 1932. H. G. KELLOGG 1,865,570
METHOD OF MANUFACTURING RADIATOR SHELLS
Filed Dec. 22, 1930 6 Sheets-Sheet 3
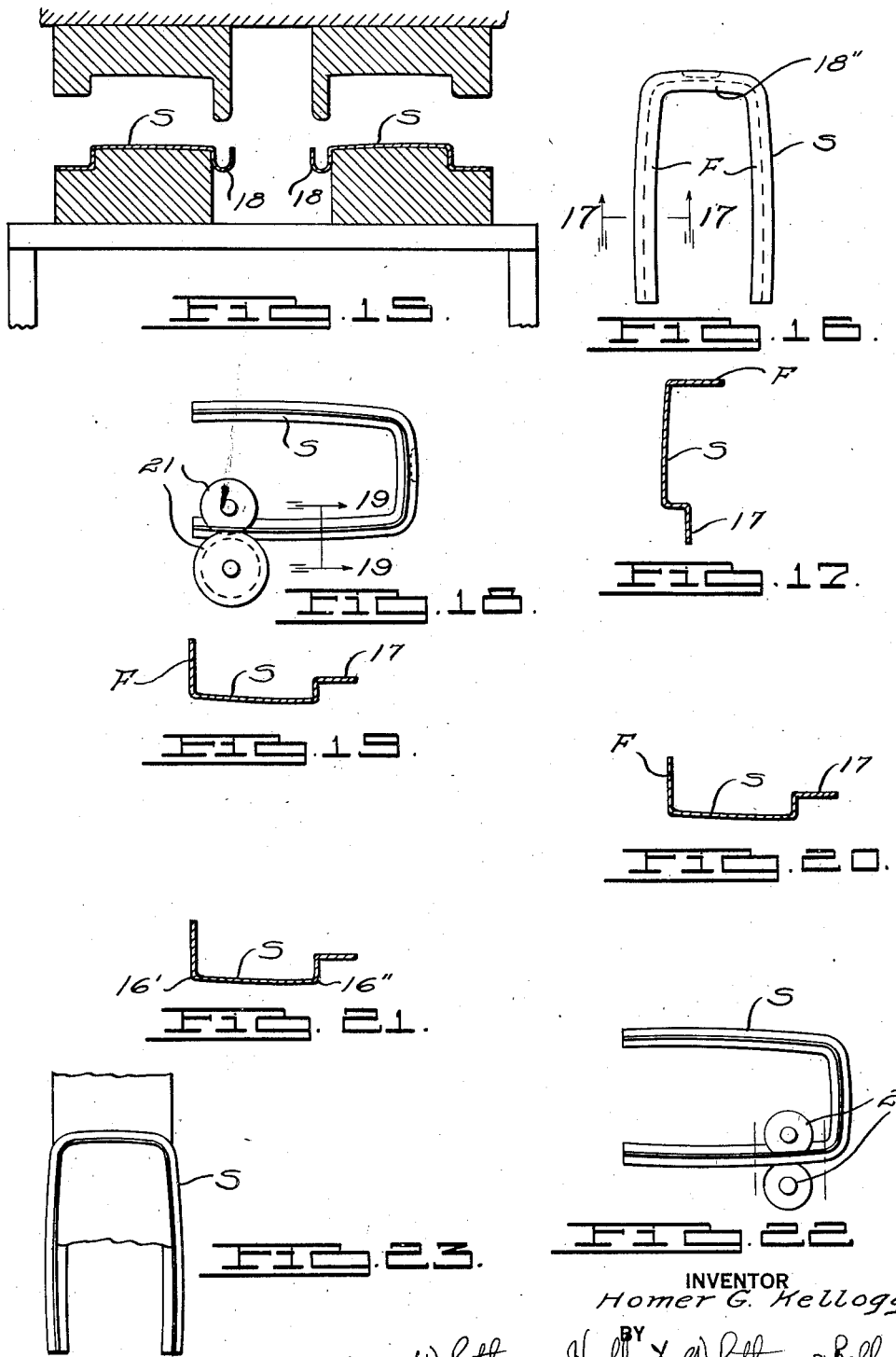
INVENTOR
Homer G. Kellogg.
BY
ATTORNEYS.

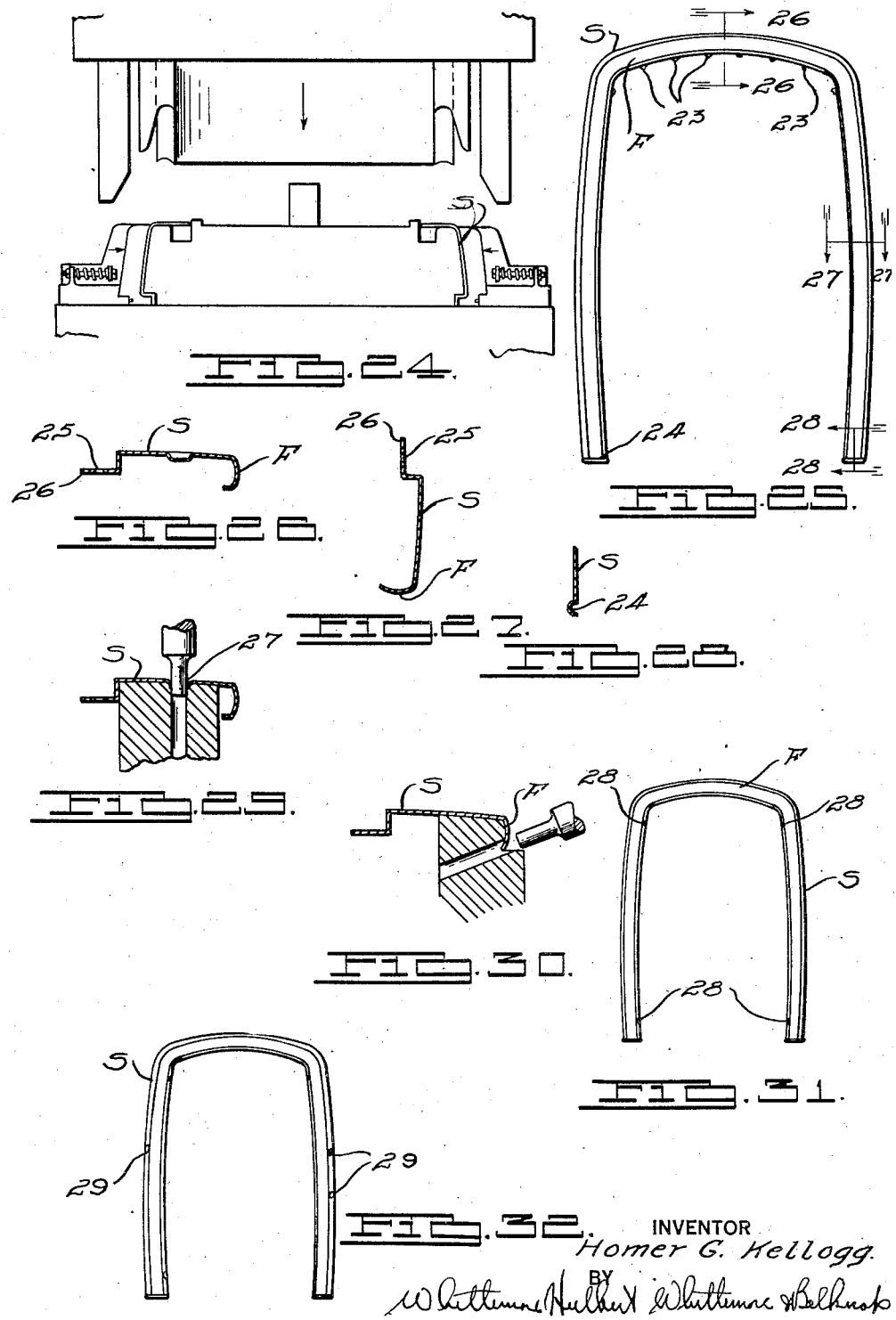

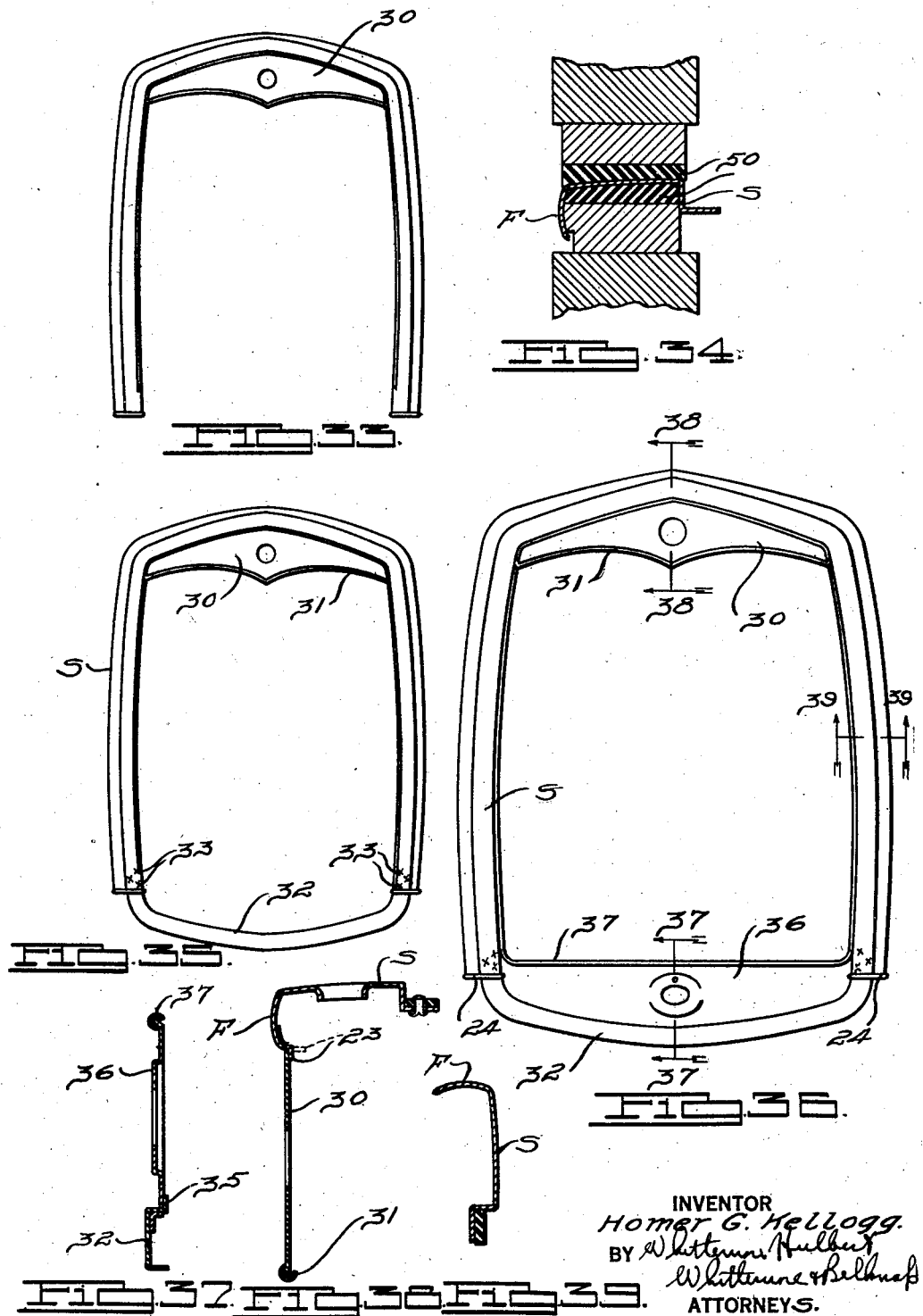

July 5, 1932. H. G. KELLOGG 1,865,570
METHOD OF MANUFACTURING RADIATOR SHELLS
Filed Dec. 22, 1930 6 Sheets-Sheet 6
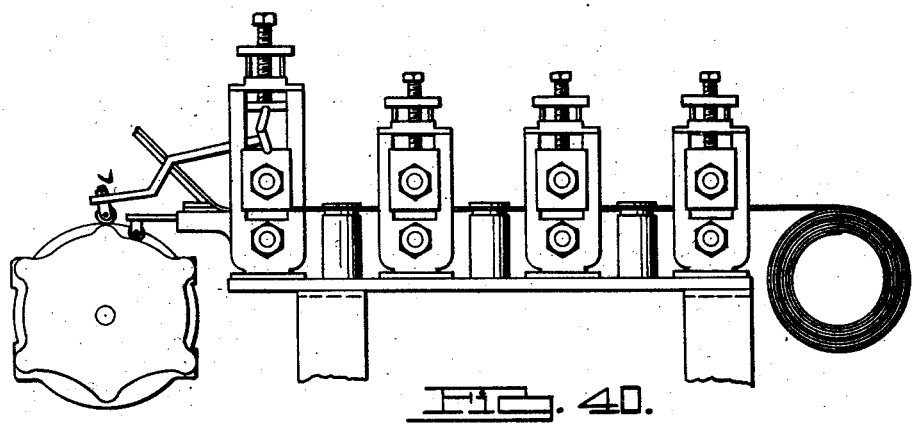
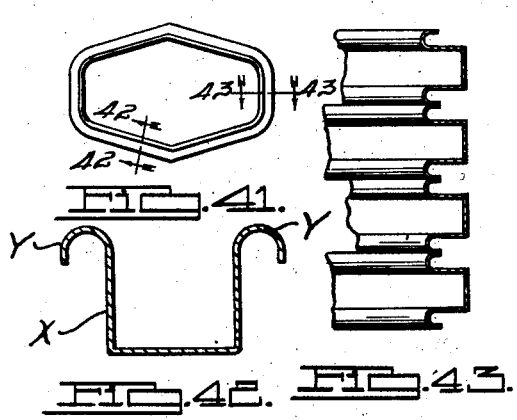
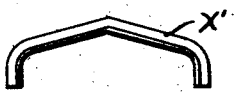
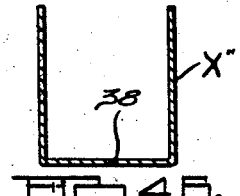
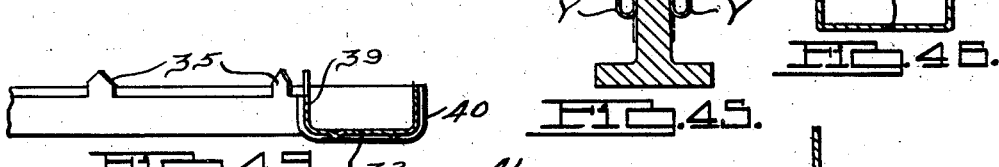
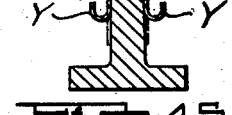
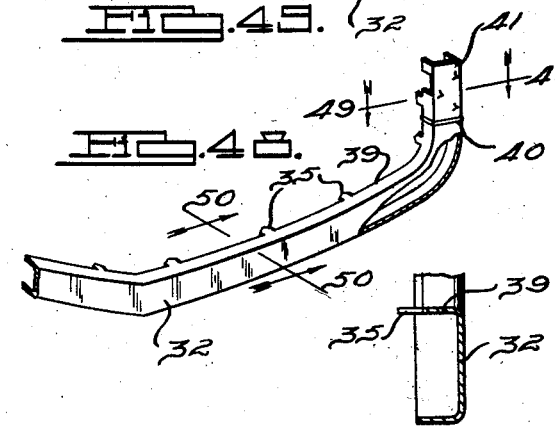
INVENTOR
Homer G. Kellogg.
BY
Whittemore Hulbert Whittemore Belknap
ATTORNEYS.

Patented July 5, 1932

1,865,570

UNITED STATES PATENT OFFICE

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK

METHOD OF MANUFACTURING RADIATOR SHELLS

Application filed December 22, 1930. Serial No. 504,098.

This invention relates to radiator shells and to the method of manufacturing the same.

The invention has as one of its important objects to provide an improved construction of radiator shell and an improved method of manufacturing the shells whereby the same may be rolled from strips or continuous strips of sheet metal in contradistinction to the heretofore known methods wherein the radiator shell was formed by pressing or drawing operations from a sheet.

It has recently become quite generally the practice to manufacture radiator shells from stainless steel which is a relatively expensive metal. Heretofore it has been quite generally the custom to stamp and press the shell from a sheet of metal with the result that the waste of metal incident to this stamping and drawing operation made this method of producing radiators from stainless steel very expensive and practically prohibitive.

In accordance with my invention, I propose manufacturing radiator shells by rolling the shell from continuous strips of metal so that all of the waste incident to prior methods is eliminated. Thus radiator shells may be made economically from stainless steel or other relatively expensive metals.

My invention contemplates the feeding of a strip through forming rolls which progressively fashions the strip both transversely and longitudinally and produces a blank from which a pair of radiator shells may be formed, the shell being rolled to substantially the desired cross-sectional contour and to a longitudinal contour comprising two opposed U-shaped sections. The free ends of the strip thus formed are united to form an annulus and the blank in the form of an annulus is then re-shaped or further fashioned and the annulus severed to produce a pair of radiator shells comprising the top and two side sections of the shells. The lower or bottom section is formed separately by a similar rolling operation from a strip of narrower width and subsequently integrated with the main section of the radiator shell.

While my invention contemplates several principal steps in the method of producing the shell and involves several novel details of construction in the resultant product, the several steps of the method or process, including several minor steps, are illustrated fully and in detail in the accompanying drawings, in which Figure 1 is a fragmentary semi-diagrammatic view through a rolling machine;

Figure 2 is a plan view of the blank produced by the rolling machine;

Figure 3 is a detail sectional view taken substantially on the plane indicated by line 3—3 in Figure 2;

Figure 4 is a similar view taken substantially on the plane indicated by line 4—4 in Figure 2;

Figure 5 is a view of the blank with the free ends united to form an annulus;

Figure 6 is a semi-diagrammatic view showing one of the pressing operations;

Figure 7 is a fragmentary sectional view taken substantially on the plane indicated by line 7—7 in Figure 6;

Figure 8 is a semi-diagrammatic view showing a punching, pressing and stretching operation performed on the annulus;

Figure 9 is a sectional view taken substantially on the plane indicated by line 9—9 in Figure 8;

Figure 10 is an elevational view of the annulus after the operation illustrated in Figure 8;

Figure 11 is a sectional view taken substantially on the plane indicated by line 11—11 in Figure 10;

Figure 12 is a view showing the annulus after having been severed;

Figure 13 is a semi-diagrammatic view showing a drawing and pressing operation for straightening the front face flange at the top and for drawing the stock which is later removed for the water spout of the radiator;

Figure 14 is a view of the blank at the completion of this operation;

Figure 15 is a semi-diagrammatic view showing the pressing operation by means of which the U-shaped flange or one longitudinal edge of the blank is straightened;

Figure 16 is a view of the blank after the operation shown in Figure 15 is performed;

Figure 17 is a sectional view taken substantially on the plane indicated by line 17—17 in Figure 16;

Figure 18 is a view showing semi-diagrammatically a re-fashioning rolling operation;

Figure 19 is a sectional view taken substantially on the plane indicated by line 19—19 in Figure 18;

Figure 20 is a sectional view through the blank after another rolling operation;

Figure 21 is a similar section through the blank after another re-shaping operation in a press;

Figure 22 is a semi-diagrammatic view showing another rolling, re-fashioning operation;

Figure 23 is a semi-diagrammatic view showing the re-fashioning operation for the top of the blank;

Figure 24 is a semi-diagrammatic view showing a press for performing simultaneously several further fashioning operations on the blank including piercing, trimming, crowning and beading;

Figure 25 is a view of the blank at the completion of this operation;

Figure 26 is a sectional view taken substantially on the plane indicated by line 26—26 in Figure 25;

Figure 27 is a sectional view taken substantially on the plane indicated by line 27—27 in Figure 25;

Figure 28 is a view substantially taken on the plane indicated by line 28—28 in Figure 25;

Figure 29 is a semi-diagrammatic view showing the punching operation for forming the water spout opening;

Figure 30 is a semi-diagrammatic view showing the punching operation for notching the blank;

Figure 31 is a view of the blank at the completion of the operation illustrated in Figure 30;

Figure 32 is a view of the blank at the completion of a subsequent punching operation;

Figure 33 is a view showing the blank with the upper decorative apron assembled;

Figure 34 is a semi-diagrammatic view showing a re-fashioning operation performed on the sides of the blank;

Figure 35 is a view of the blank with the lower shell section integrated therewith;

Figure 36 is a view showing the shell with the lower decorative panel or apron associated therewith;

Figure 37 is a sectional view taken substantially on the plane indicated by line 37—37 in Figure 36;

Figure 38 is a sectional view taken substantially on the plane indicated by line 38—38 in Figure 36;

Figure 39 is a sectional view taken substantially on the plane indicated by line 39—39 in Figure 36;

Figure 40 is a view similar to Figure 1 showing the rolling machine for rolling the lower shell section;

Figure 41 is a view of the strip as it is preformed by the rolling machine illustrated in Figure 40;

Figure 42 is an enlarged sectional view taken substantially on the plane indicated by line 42—42 in Figure 41;

Figure 43 is an enlarged sectional view taken substantially on the plane indicated by line 43—43 in Figure 41, showing a plurality of the convolutions of the blank shown in Figure 41;

Figure 44 is an elevation of the blank severed from the strip produced by the rolling machine;

Figure 45 is a semi-diagrammatic view showing a pressing operation for straightening the return-bent flanges of the blank;

Figure 46 is a view showing the blank after the performance of the operation illustrated in Figure 45;

Figure 47 is a view of the blank shown in Figure 46 after being longitudinally severed;

Figure 48 is a fragmentary view of this blank after having had performed thereon a re-fashioning and shearing operation;

Figure 49 is a sectional view taken substantially on the plane indicated by line 49—49 of Figure 48, and Figure 50 is a sectional view taken substantially on the plane indicated by line 50—50 in Figure 48.

As shown in Figure 1, my invention contemplates transversely and longitudinally fashioning a continuous strip of metal by means of a rolling machine 10 having a plurality of shaping rolls 11 and 12 and having means indicated generally by the reference character 13 for rotating the upper roll 14 of the last pair of rolls about the axis of its companion roll. This latter means performs the longitudinal fashioning operation while the rolls 11 and 12 perform the transverse fashioning operation.

The blank B resulting from the rolling operation is illustrated in Figures 2, 3 and 4 and as will be observed consists of a pair of opposed U-shaped sections B', the blank being in the form of a complete annulus with the exception of the free ends B''. These free ends are integrated as, for instance, by welding at the point 15, see Figure 5, to provide an annulus.

As seen in Figures 3 and 4 the blank is formed with a cross-section including a main body portion 16, a laterally angular extending flange 17 and a substantially U-shaped flange 18. In transversely fashioning the strip in the rolling machine, the metal forming the flange 18 is return-bent so that the depth of the resulting channel will not be so great as to prevent the ready longitudinal fashioning of the strip. This return-bent flange 18 is later straightened or bent inwardly in the general plane of the portion adjacent the body portion 16 of the blank and forms the front face of the radiator shell.

At this point the ends of the blank B are re-fashioned or re-shaped as suggested in Figures 6 and 7.

The annulus B is then placed in the stretching device 19 illustrated in Figure 8 and subjected to a circumferential stretching operation which increases the diameter of the corner section 16″ over that of the front or forward corner portion 16′. While a certain difference in diameter between the corner portion 16′ and 16″ is provided during the rolling operation, the final desired differential in these diameters to provide the proper transverse inclination of the shell, is produced by the stretching mechanism illustrated in Figures 8 and 9. At the same time the return-bent flange 18 is straightened as at 18′ adjacent each end of the annulus. The manner in which the diameter of the corner section 16″ is increased with reference to the corner portion 16′, is probably best shown in Figure 11.

In Figure 12 the annulus B is shown as severed centrally along the line 19 to provide the two shell blanks S.

One of these blanks S is then subjected to the operation shown in Figure 13 which draws the metal as at 20 where it is later pierced to provide the aperture for the water spout and the return-bent flange 18 adjacent the top of the shell is bent inwardly to provide the top front face 18″ of the shell.

From Figures 15 and 16 it will be apparent that the next operation is straightening the return-bent flange 18 at the sides of the shell into a common plane with the top front face 18″. The shell S after this operation is shown in plan view in Figure 16 and in section in Figure 17. The front face of the shell S now lies in the same general plane and is indicated by the reference character F.

In Figures 18 and 19 there is shown an operation employing rollers 21 by means of which the shell S is additionally fashioned or shaped by rolling at the sides thereof.

In Figure 20 the shell is illustrated in cross-section after a rolling operation has been performed on the front face flange F for the purpose of removing wrinkles and other irregularities therefrom.

In Figure 21 the blank S is shown after a re-shaping operation performed at the corners 16′ and 16″.

In Figure 22 there is illustrated a rolling operation employing rolls 22 for a portion of each of the sides adjacent the top of the shell and in Figure 23 there is shown a re-shaping operation for the top of the shell.

In Figure 24 means is semi-diagrammatically illustrated for simultaneously performing several operations on the shell S. One of these is to shear the blank to form adjacent the top therefore and at the lower edge of the front flange F, a plurality of tongues 23. At the same time the front face F is crowned as shown most clearly in the sectional view in Figures 26 and 27. The lower ends of the shell S are beaded as at 24. Thus this operation is a combined pressing, piercing, trimming and shearing operation. During this operation the openings 25 are punched in the rear flange 26 of the shell.

In Figure 29 there is semi-diagrammatically illustrated the step of removing the stock to form the water spout opening 27.

In Figure 30 there is semi-diagrammatically illustrated the step of punching the front face F to form notches 28 which register with beads on the upper and lower aprons which are subsequently assembled with the shell.

In Figure 32 the shell S is shown after a punching operation in which certain apertures 29 are formed in the sides of the shell.

By comparison of Figures 33 and 35 to 39 inclusive, the manner in which the several parts of the shell are assembled will be apparent. The reference character 30 indicates an upper panel or apron which is secured to the shell adjacent the top thereof. This panel or apron 30 is provided with slots which register with the tongues 23 previously formed on the lower edge of the face F of the shell. As shown in Figure 38 in dotted lines, these tongues normally extend at substantial right angles to the face F and after the apron or panel 30 has been assembled therewith, these tongues are bent down as shown in full lines in Figure 38. This secures the apron or panel 30 to the shell. This panel 30 has a bead 31 along its lower edge and the ends of this bead pass through the upper pair of notches 28 previously formed by the operation illustrated in Figure 30.

The reference character 32 indicates a lower or bottom shell section which is rolled separately and then integrated with the main shell section as, for instance, by welding. The ends of the shell section 32 are telescoped within the lower end of the shell section S so as to be arranged in overlapping relation and then the parts are welded as, for instance, at 33. The shell in this condition before the attachment of the lower panel is illustrated in Figure 35. In Figure 36 the lower panel is shown secured in place. This panel is attached by means of tongues 35 formed on the shell section 32, see particularly Figure 48, which pass through slots formed in the panel 36 in the same manner as described in connection with panel 30. In Figure 37 the tongues 35 are shown as having been passed through the slots in the panel 35 and then bent over to secure the panel in place. The panel 36 is provided with a bead 37 along its upper edge which it passes through the notches 28 formed adjacent the lower ends of the shell S by means of the operation illustrated in Figure 30.

In Figure 34 there is semi-diagrammatically illustrated a shaping operation between dies provided with cushion surfaces 50.

In Figure 40 there is illustrated a rolling machine substantially similar to that illustrated in Figure 1 by means of which a strip of metal is fashioned transversely and longitudinally in the form of a continuous helix having the longitudinal configuration and the transverse configuration best illustrated in Figures 41, 42 and 43. Inasmuch as it is difficult to longitudinally fashion a deep channel section, the transverse fashioning of the strip provides a U-shaped strip X having return-bent side flanges Y. The strip or blank X is then severed to produce a substantially U-shaped blank X', see Figure 44. This blank X' is then subjected to the operation suggested in Figure 45 where the return-bent flanges Y are bent downwardly or straightened so as to form a blank X'' having the cross-section illustrated in Figure 46. This blank is then longitudinally severed along the line 38 and is subjected to a shaping and piercing operation wherein one edge of the blank is bent to form a flange 39 and the edge of this blank is trimmed to form the tongues 35, thus producing the lower shell section 32 illustrated in Figures 48, 49 and 50. At the same time a bead 40 is formed on each end and beyond each bead the free end 41 is provided which, as previously described, telescopes with the lower ends of the main shell section S. Also as previously described, the parts are then integrated as, for instance, by welding. In assembling the lower shell section 32 with the main shell section S, the beads 40 formed on the section 32 preferably fit within the beads 24 formed on the lower ends of the shell section S.

It is economical to roll the lower shell section 32 separately from the main shell section S because the cross-section of this section is much less than the cross-section of the main shell and thus a considerable saving in material is effected.

The panels 30 and 36 are usually, in accordance with this process, preferably formed by stamping from a different type of metal so as to provide a contrast which enhances the appearance and decorative effects of the shell.

While most of the steps incident to the production of my improved type of radiator shell have been recited herein, several conventional steps have been omitted and many of the steps herein separately illustrated and described may obviously be combined or omitted. The essential features of the invention are, however, those steps which permit of the production of radiator shells by rolling operations from strips of metal.

While in the foregoing description, the method has been described as employing strips of continuous strips of sheet metal, it should be understood that the invention contemplates the use of strips of any desired length as, for instance, one sufficient only for the production of a single radiator shell or for the production of two radiator shells or further, a substantially continuous strip which is subsequently cut to length during the carrying out of the method as hereinbefore described. For instance, sheets of sheet metal might be conveniently cut into short strips sufficient for the production of one or two radiator shells inasmuch as sheet stock is generally cheaper than continuous strip stock.

Therefore reservation is made to make such changes and re-arrangement in the steps of my herein described process and in the details of construction of the product as may come within the purview of the accompanying claims.

What I claim as my invention is:

1. The method of manufacturing radiator shells and the like including the steps of rolling a strip to fashion the same transversely and to longitudinally fashion the same to produce opposed return-bent sections, uniting the free ends to form an annulus, re-fashioning said annulus, and severing said annulus.

2. The method of manufacturing radiator shells and the like including the steps of rolling a strip to fashion the same transversely and to longitudinally fashion the same to produce opposed return-bent sections, uniting the free ends to form an annulus, re-fashioning the same while in annular form, and severing said annulus to produce a pair of shells.

3. In the method of manufacturing radiator shells the steps of rolling a strip of metal to progressively fashion the cross-sectional contour thereof and to longitudinally fashion the same to produce return-bent ends, uniting said ends to produce an annulus, re-fashioning said annulus, and severing said annulus to form a pair of U-shaped shells.

4. In the method of manufacturing radiator shells, the steps of rolling a strip to transversely and longitudinally fashion the same to substantially the desired shape, and subsequently re-fashioning and severing the same to produce a radiator shell.

5. In the method of manufacturing radiator shells the steps of rolling a strip to transversely and longitudinally fashion the same to form a pair of radiator shell blanks of substantially the desired shape, and subsequently re-fashioning and severing the same to produce two radiator shells.

6. The method of manufacturing radiator shells and the like from a continuous strip of metal which consists in rolling said strip to progressively transversely fashion the same and to longitudinally fashion the same to provide a pair of opposed return-bent sections, uniting the free ends of said sections to form an annulus, additionally re-shaping said annulus by a stretching operation and severing said annulus in half to produce a pair of shell sections.

7. In the method of manufacturing radiator shells and the like from continuous strips of metal, the steps of rolling said strip to transversely fashion said strip to substantially the desired cross-section and to longitudinally fashion said strip to form a pair of opposed U-shaped shell sections, uniting the free ends of said sections to form an annulus, additionally fashioning the transverse shape of each section by a stretching operation performed on said annulus and subsequently severing said annulus in half to produce a pair of shell sections.

8. In the method of manufacturing radiator shells and the like the steps of rolling a strip to fashion the cross-sectional contour thereof to include a return-bent flange, and longitudinally fashioning the strip to provide opposed return-bent ends, uniting said ends to form an annulus, stretching the annulus to re-fashion said strip, severing the annulus to produce a pair of U-shaped shells, and straightening the return-bent flange into a plane substantially at right angles to the body of the strip.

9. In the method of manufacturing radiator shells the steps of rolling a strip to transversely fashion the same to produce a channel shaped cross-section having a return-bent flange at one edge thereof, and longitudinally fashioning the strip to provide opposed return-bent ends, uniting said ends to form an annulus, subjecting said annulus to a stretching operation to transversely additionally fashion said strip, severing said annulus in half, and straightening said return-bent flange into a common plane.

10. In the method of manufacturing radiator shells the steps of rolling a strip to transversely fashion the same to produce a channel shaped cross-section having a return-bent flange at one edge thereof, and longitudinally fashioning the strip to provide opposed return-bent ends, uniting said ends to form an annulus, subjecting said annulus to a stretching operation to transversely additionally fashion said strip, severing said annulus in half, straightening said return-bent flange into a common plane and crowning said straightened flange.

11. In the method of manufacturing radiator shells the steps of rolling a strip to transversely and longitudinally fashion the same to form a pair of radiator shell blanks of substantially the desired shape, subsequently re-fashioning and severing the same to produce two substantially U-shaped shell blanks and integrating a separately formed section to the free ends of said U-shaped blank.

12. In the method of manufacturing radiator shells the steps of rolling a strip to fashion the same transversely and to longitudinally fashion the same to produce opposed return-bent sections, uniting the free ends to form an annulus, re-fashioning said annulus, severing said annulus to produce a pair of U-shaped sections, and integrating a separate preformed section to the free ends of each of said U-shaped sections.

13. In the method of manufacturing radiator shells the steps of rolling a strip to fashion the same transversely and to longitudinally fashion the same to produce opposed return-bent sections, uniting the free ends to form an annulus, re-fashioning said annulus, severing said annulus to produce a pair of U-shaped sections, separately preforming from a continuous strip by means including a rolling operation a second shell section and integrating said second shell section to the free ends of said U-shaped section.

In testimony whereof I affix my signature.

HOMER G. KELLOGG.